(12) United States Patent
Koh

(10) Patent No.: US 8,799,433 B2
(45) Date of Patent: Aug. 5, 2014

(54) METHOD AND APPARATUS FOR UPGRADING SOFTWARE OF DIGITAL BROADCASTING RECEIVER

(75) Inventor: Kwang-hyun Koh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 601 days.

(21) Appl. No.: 11/655,920

(22) Filed: Jan. 22, 2007

(65) Prior Publication Data

US 2008/0077681 A1 Mar. 27, 2008

(30) Foreign Application Priority Data

Sep. 26, 2006 (KR) .......................... 10-2006-0093729

(51) Int. Cl.
*G06F 15/177* (2006.01)
*G06F 15/173* (2006.01)

(52) U.S. Cl.
USPC ........... 709/223; 725/132; 725/140; 725/153; 709/221; 709/220

(58) Field of Classification Search
USPC ................. 709/223–226, 245, 220, 246, 221; 725/132, 140
See application file for complete search history.

(56) References Cited

U.S. PATENT DOCUMENTS

| 6,167,567 | A | 12/2000 | Chiles et al. | |
|---|---|---|---|---|
| 6,331,876 | B1 * | 12/2001 | Koster et al. | 348/725 |
| 6,343,379 | B1 * | 1/2002 | Ozawa et al. | 725/63 |
| 6,425,125 | B1 * | 7/2002 | Fries et al. | 717/168 |
| 6,813,778 | B1 * | 11/2004 | Poli et al. | 725/132 |
| 7,017,178 | B1 * | 3/2006 | Hendricks et al. | 725/152 |
| 7,028,330 | B1 * | 4/2006 | Gaughan et al. | 725/110 |
| 7,069,578 | B1 * | 6/2006 | Prus et al. | 725/132 |
| 7,117,482 | B2 * | 10/2006 | Nguyen et al. | 717/122 |
| 7,120,926 | B1 * | 10/2006 | Safadi et al. | 725/132 |
| 7,571,221 | B2 * | 8/2009 | Rao et al. | 709/220 |
| 7,757,261 | B2 * | 7/2010 | Addington et al. | 725/114 |
| 7,835,505 | B2 * | 11/2010 | Toyama et al. | 379/90.01 |
| 2002/0120885 | A1 * | 8/2002 | Choi et al. | 714/38 |
| 2002/0144251 | A1 * | 10/2002 | Cho | 717/168 |
| 2002/0152467 | A1 * | 10/2002 | Fiallos | 725/50 |

(Continued)

FOREIGN PATENT DOCUMENTS

| CN | 2002351687 A | 12/2002 |
|---|---|---|
| KR | 10-1999-0016897 A | 3/1999 |

(Continued)

OTHER PUBLICATIONS

Notice of Allowance dated Oct. 2, 2007 issued by the Korean Intellectual Property Office for Korean Patent Application No. 10-2006-0093729.

(Continued)

*Primary Examiner* — Kostas Katsikis
(74) *Attorney, Agent, or Firm* — Sughrue Mion, PLLC

(57) ABSTRACT

A method and apparatus of upgrading software in a digital broadcasting receiver are provided. The apparatus includes a receiving unit which receives upgrade information including information on versions of a plurality of modules included in the software and information on an upgrading method, and an upgrading unit which performs the upgrading of the software according to the upgrade information by using upgrade data. Accordingly, only the modules which need upgrading can be selectively upgraded, so that it is possible to increase the efficiency of the upgrading.

14 Claims, 4 Drawing Sheets

(56) References Cited

U.S. PATENT DOCUMENTS

| | | | | |
|---|---|---|---|---|
| 2002/0152473 | A1* | 10/2002 | Unger | 725/120 |
| 2002/0177437 | A1* | 11/2002 | Chesavage et al. | 455/426 |
| 2002/0194527 | A1* | 12/2002 | Murai et al. | 714/6 |
| 2003/0028899 | A1* | 2/2003 | MacInnis | 725/132 |
| 2003/0233442 | A1* | 12/2003 | Futatsugi | 709/223 |
| 2004/0078686 | A1* | 4/2004 | Toyooka et al. | 714/38 |
| 2004/0083471 | A1* | 4/2004 | Nam et al. | 717/168 |
| 2004/0260798 | A1* | 12/2004 | Addington et al. | 709/223 |
| 2005/0108757 | A1 | 5/2005 | Lee et al. | |
| 2005/0108771 | A1* | 5/2005 | Kim | 725/132 |
| 2005/0144651 | A1* | 6/2005 | Prus et al. | 725/134 |
| 2005/0149921 | A1* | 7/2005 | Rollins | 717/168 |
| 2006/0041509 | A1* | 2/2006 | Koerber | 705/51 |
| 2006/0150217 | A1* | 7/2006 | Joo et al. | 725/50 |
| 2006/0285690 | A1* | 12/2006 | Jung | 380/237 |

FOREIGN PATENT DOCUMENTS

| | | |
|---|---|---|
| KR | 10-0626830 A | 11/2000 |
| KR | 100534596 A1 | 5/2004 |
| KR | 10-2005-0047450 A | 5/2005 |
| KR | 10-2006-0075844 A | 7/2006 |
| KR | 10-2006-0094369 A | 8/2006 |
| WO | WO 2004031949 A2 * | 4/2004 |

OTHER PUBLICATIONS

"ATSC Standard: Software Download Data Service"; Advanced Television Systems Committee; Nov. 16, 2004; pp. 1-14.

"Digital Video Broadcasting (DVB); Specification for System Software Update in DVB Systems"; ETSI TS 102 006 V1.2.1, Oct. 2002; pp. 1-39.

"OpenCable Specifications"; CableCARD Interface 2.0 Specification; OC-SP-CCIF2.0-103-051117; CableLabs; Nov. 17, 2005; 272 pgs.

* cited by examiner

METHOD AND APPARATUS FOR UPGRADING SOFTWARE OF DIGITAL BROADCASTING RECEIVER

CROSS-REFERENCE TO RELATED PATENT APPLICATION

This application claims priority from Korean Patent Application No. 10-2006-0093729, filed on Sep. 26, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a software upgrading method and apparatus, and more particularly, to a software upgrading method and apparatus capable of efficiently upgrading software of a digital broadcasting receiver.

2. Description of the Related Art

Digital broadcasting is a type of broadcasting service for producing content in a digital scheme and broadcasting the digital content with high video and audio qualities. Digital broadcasting has developed rapidly due to the development of various wired and wireless communication techniques, and viewers' demands for high quality video and audio digital content. Although digital broadcasting is more complicated than analog broadcasting, it can process various types of information, and is thus expected to be used in various fields such as education, medicine, and military industry.

A digital broadcasting receiver includes an apparatus which receives a digital broadcasting signal and processes an A/V stream and a data stream included in the broadcasting signal. Set top boxes and digital TVs (DTV) are examples of digital broadcasting receivers. The digital broadcasting receiver is controlled by software, which may contain errors or become out of date, and, thus, needs to be upgraded.

FIG. 1 shows a software upgrading apparatus in a digital broadcasting receiver in the related art.

Referring to FIG. 1, a tuner 100 receives a digital broadcasting signal through a channel selected by a user from a broadcasting signal which is transmitted electromagnetically or through a cable. The tuner 100 de-modulates the received signal into a baseband signal to generate a transport stream. The transport stream includes an audio stream, a video stream, and a data stream. The data stream includes data which is used to broadcast data and transmit information on programs. The data stream also includes data which is used to upgrade the software. Such a data stream is transmitted to the digital broadcasting receiver.

A de-multiplexer 101 extracts the data stream included in the transport stream and transmits the data stream to a data decoder 104. The data decoder 104 decodes upgrade data for the software included in the data stream and transmits the upgrade data for the software to an upgrade management unit 105.

The upgrade management unit 105 extracts an upgrade image from the upgrade data. The upgrade image is used to upgrade the software, and is stored through a memory input/output interface 106 in a permanent memory 107 to complete the software upgrading.

As the digital broadcasting receiver is given more functions, its software becomes larger and more complicated. Conventional software upgrading methods are inefficient, because when some portions of the software need to be upgraded, upgrade images of all portions are received and stored in the permanent memory 107.

As the structure of the software becomes complicated, various upgrading methods are needed as well as simply storing the upgrade image. For example, when the upgrading is performed after rebooting the digital broadcasting receiver or when the upgrading fails, the software needs to be recovered. In these cases, the upgrading cannot be simply completed with only the upgrading method of storing the upgrade image in the permanent memory 107.

Therefore, there is a need for an upgrading method which can efficiently upgrade the software in the digital broadcasting receiver with various upgrading schemes.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, an aspect of the present invention provides a method and apparatus for efficiently upgrading software in a digital broadcasting receiver.

The present invention also provides a computer-readable medium having embodied thereon a computer program for the aforementioned method.

According to an aspect of the present invention, there is provided a method of upgrading software in a digital broadcasting receiver, comprising: receiving upgrade information of the software and upgrade data required for performing the upgrading; and performing the upgrading of the software according to the upgrade information by using the upgrade data, wherein the upgrade information includes information on the versions of modules included in the software and information on an upgrading method.

In the above aspect of the present invention, the receiving of the upgrade information may comprise: receiving the upgrade information of the software; determining whether a plurality of modules included in the software need upgrading, based on the upgrade information; and selectively receiving upgrade data for individually upgrading the modules which need upgrading according to the result of the determination.

The upgrade data may include an upgrade application or script which is used to perform the upgrading based on the information on the upgrading method included in the upgrade information.

The performing of the upgrading may comprise performing the individual upgrading for a plurality of modules included in the software.

The method may further comprise: determining whether the upgrading performed according to the upgrade information has succeeded; and selectively recovering the software according to the result of the determination.

According to another aspect of the present invention, there is provided an apparatus for upgrading software in a digital broadcasting receiver, comprising: a receiving unit which receives upgrade information of the software and upgrade data required for performing the upgrading; and an upgrading unit which performs the upgrading of the software according to the upgrade information by using the upgrade data, wherein the upgrade information includes information on versions of modules included in the software and information on an upgrading method.

In the above aspect of the present invention, the receiving unit may comprise: an information receiving unit which receives the upgrade information of the software; a determination unit which determines whether a plurality of modules included in the software need upgrading, based on the upgrade information; and a data receiving unit which selectively receives upgrade data for individually upgrading the modules which need upgrading according to the result of the determination.

The apparatus may further include a recovering determination unit which determines whether the upgrading performed according to the upgrade information has succeeded; and a recovery unit which recovers the software when the upgrading is determined not to have succeeded.

According to another aspect of the present invention, there is provided a computer-readable medium having embodied thereon a computer program for performing the aforementioned method.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE EXEMPLARY EMBODIMENTS

Exemplary embodiments of the present invention will now be described in detail with reference to the accompanying drawings.

Figure 1:
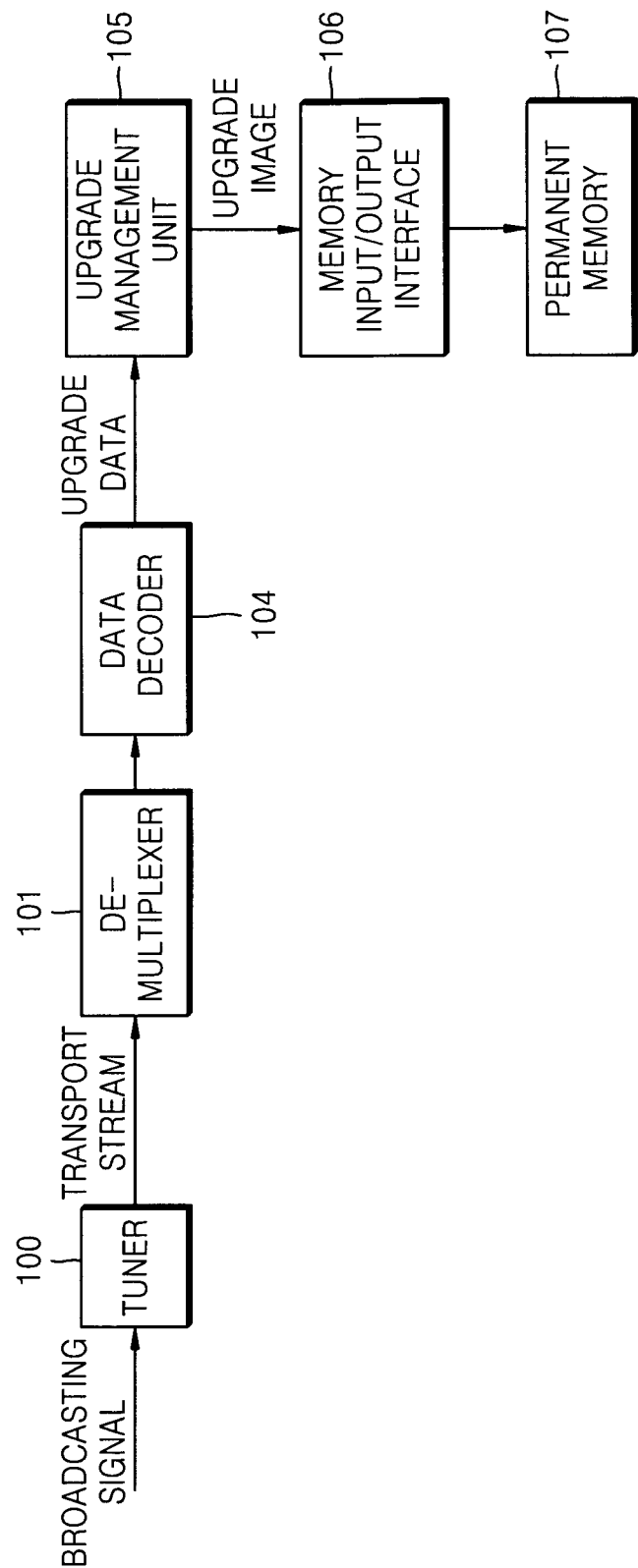
FIG. 1 shows a software upgrading apparatus in a digital broadcasting receiver in the related art.
Figure 2:
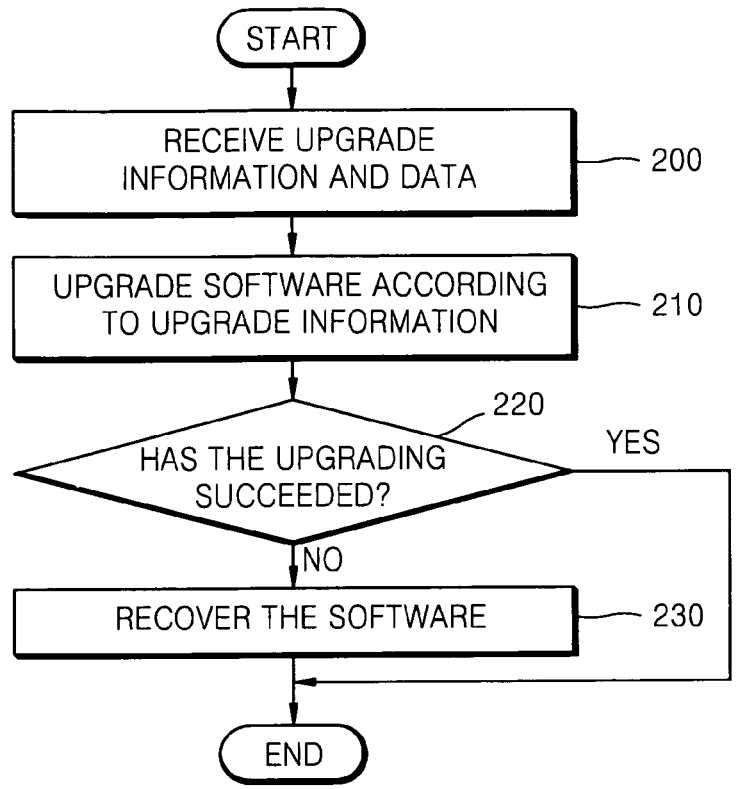
FIG. 2 is a flowchart of a software upgrading method in a digital broadcasting receiver according to an exemplary embodiment of the present invention.

FIG. 2 is a flowchart of a software upgrading method in a digital broadcasting receiver according to an exemplary embodiment of the present invention Referring to FIG. 2, in operation 200, the digital broadcasting receiver receives upgrade information and data for software.

The digital broadcasting receiver is controlled by software, which may have errors or become out of date, and thus needs to be upgraded. The software may include a boot-loader, an operating system (OS), device drivers, libraries, and built-in applications for the digital broadcasting receiver.

The upgrade information includes information on the software version and the upgrading method. The upgrade information may be transmitted to the digital broadcasting receiver in form of an extensible markup language (XML) file or a binary file.

The information on the software version includes an organization unique identifier (OUID), the type of service, the hardware version, the software release date, and the like. In addition to the aforementioned items, the information on the version of the software may be any information used to identify the version of the software. Information on the versions of modules included in the software may be included as the information on the version of the software included in the upgrade information.

Each of the modules is a functional unit which performs a specific function in the software to be upgraded. Additionally, each module may be the smallest unit which can be individually upgraded.

The information on the upgrading method includes an upgrading policy, the type of the upgrade data, a transmission scheme of the upgrade data, the position for storing the upgrade data, the time for upgrading, and processes required before and after the upgrading. The upgrade data may be stored in the permanent memory or the file system according to the upgrade information for upgrading the software.

In the upgrading method in the related art, the upgrade image is stored in a specific position of the permanent memory. However, according to an exemplary embodiment of the present invention, the upgrade information includes various upgrading policies, and the digital broadcasting receiver performs the upgrading according to the various upgrading policies. For example, a module may be replaced with an upgraded module or removed, in the upgrading according to this exemplary embodiment. In addition, a new module may be added in the upgrading. Of course, the upgrading policy of simply storing the upgrade image in the permanent memory is included in the possible upgrading policies of this exemplary embodiment.

The upgrade data may be a binary image like the upgrade image used in the related art. In addition, the upgrade data may be an upgrade file used to upgrade software using a file system. Therefore, the upgrade information also may include information on the type of the upgrade data. The upgrade information may also include information on the binary image or information on a transmission scheme of the compressed upgrade file transmitted to the digital broadcasting receiver.

The information on the transmission scheme of the upgrade data includes the transmission scheme of the upgrade data transmitted to the digital broadcasting receiver. The information on the transmission scheme of the upgrade data also includes information on the transmission scheme in the related art, where the upgrade data is included in the broadcasting signal. According to this exemplary embodiment, the upgrade data may be transmitted to the digital broadcasting receiver in the form of a broadcasting signal using a digital storage media-command and control (DSMCC) or through an external storage medium such as a home network or a USB memory. The information on the transmission scheme of the upgrade data includes information on the path through which the upgrade data is received. There is no limitation on the schemes of receiving the upgrade information and the upgrade data, as well as the methods of upgrading the software. Therefore, various software upgrading methods may be provided.

The information on the position for storing the upgrade data includes information on the storage position of the permanent memory or the file system. In the case of storing the binary image in the permanent memory, the information on the position for storing the upgrade data includes the memory address where the binary image is to be stored. In the case of upgrading the software using the file system, the information on the position for storing the upgrade data includes the path of the upgrade file to be stored.

Information on the time for upgrading includes the time to start the upgrading. For example, when the upgrading is performed after the digital broadcasting receiver is rebooted, information on the rebooting is included in the information on the time for upgrading. If a plurality of modules included in the software is upgraded in a certain order, the time for upgrading can be used to set the upgrading order of the modules. For example, if a kernel must be upgraded after the boot-loader, the information of the time for the upgrading the modules may be included in the upgrade information.

In addition, the upgrade information may include information on processes required before and after the upgrading (preparation processes and after processes). As an example of the preparation process, in an upgrading method where a binary image is stored in a specific position of the permanent memory, a previously stored binary image may be removed before the upgraded binary image is stored. In an upgrading method using a file system, a directory in which a file is to be stored may be generated as an example of the preparation process, and a link for the newly stored file may be generated as an example of the after process. If compressed upgrade data is transmitted to the digital broadcasting receiver, the compressed upgrade data may be decompressed as an example of the preparation process, and after the decompression, the compressed upgrade data may be removed as an example of the after process.

As described above, the upgrade data is stored in the permanent memory or the file system according to the upgrade information for upgrading the software. According to this exemplary embodiment, in addition to the data stored in the permanent memory or the file system, the upgrade data may include applications or scripts used to upgrade the modules according to the upgrade information.

Exemplary embodiments of the present invention also provide various upgrading methods performed in the digital broadcasting receiver. Different upgrading methods may be performed in the same digital broadcasting receiver, and modules included in the same software may be upgraded by different upgrading methods.

In the upgrading method according to an exemplary embodiment of the present invention, the upgrade data may include applications or scripts used to perform the upgrading according to the upgrade information. Even in an upgrading method which is not performed by using the application or script currently built in the digital broadcasting receiver, the upgrading may be performed by receiving and executing a suitable application or script. Therefore, various upgrading methods can be performed. Since a plurality of modules can be upgraded by executing different applications or scripts, different upgrading methods can be performed on the different modules in one upgrading process.

The upgrade information and the upgrade data may be individually received. Alternatively, the upgrade information and the upgrade data may be received in the form of one upgrade image. In the case of receiving one upgrade image, the upgrade information and the upgrade data are individually extracted, and then the upgrading is performed.

Figure 3:
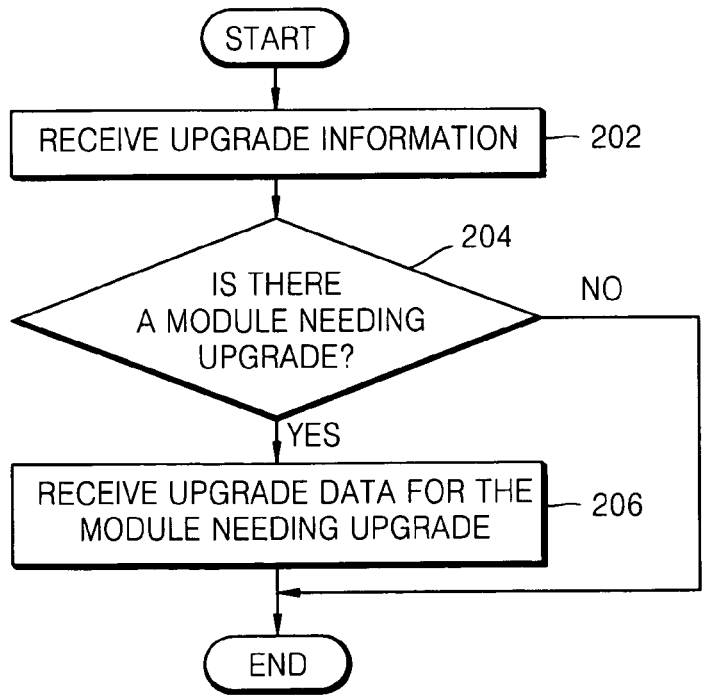
FIG. 3 is a flowchart of a method of receiving upgrade information and data according to another exemplary embodiment of the present invention.

FIG. 3 is a flowchart of a method of receiving upgrade information and data according to another exemplary embodiment of the present invention.

Returning to FIG. 2, in operation 200, the digital broadcasting receiver receives both the upgrade information and the upgrade data. However, in another exemplary embodiment of the present invention, only the upgrade data for the modules to be upgraded may be selectively received, as shown in FIG. 3.

In operation 202, the digital broadcasting receiver receives the upgrade information. As described above, the upgrade information includes information on the software version and information on the upgrading method.

In operation 204, the digital broadcasting receiver determines whether any module needs to be upgraded, based on the version of the software included in the upgrade information. The information on the software version included in the upgrade information includes information on the versions of a plurality of modules included in the software. Therefore, it can be determined based on information on the versions of the modules whether or not each module needs to be upgraded.

In operation 206, the digital broadcasting receiver selectively receives only the upgrade data for the modules to be upgraded. After the upgrade information is received, the upgrade data for the modules to be upgraded is received, so that it is possible to prevent unnecessary upgrade data from being received.

In operation 210, the digital broadcasting receiver performs the software upgrading based on the upgrade information by using the upgrade data received in operation 200. As a result of the upgrading, the upgrade data is stored in the permanent memory or the file system.

Since the upgrade information includes information on upgrading schemes for the modules included in the software, it is possible to individually upgrade the modules.

Alternatively, the upgrading may be performed by executing the upgrade application or script which is received together with the upgrade data.

In operation 220, the digital broadcasting receiver determines whether the upgrading performed in operation 210 has succeeded. If initialization of the software in the digital broadcasting receiver fails or if A/V data is not received properly, the upgrading has not succeeded. In these cases, recovery of the software is performed in operation 230.

In operation 230, the digital broadcasting receiver performs the recovery of the software. The previous software, from before the upgrade, is stored in a storage unit of the digital broadcasting receiver. When the upgrading does not succeed, the recovery of the software is performed by reading out and storing the previous software.

Similar to the upgrading, the recovery may be performed by executing an application of script. When the upgrading is not performed by simply storing the binary image in the permanent memory, the recovery is not completed by simply storing the previous software in the permanent memory. In this case, a separate application or script for the recovery is received, and the recovery is performed by executing the received application or script.

Figure 4:
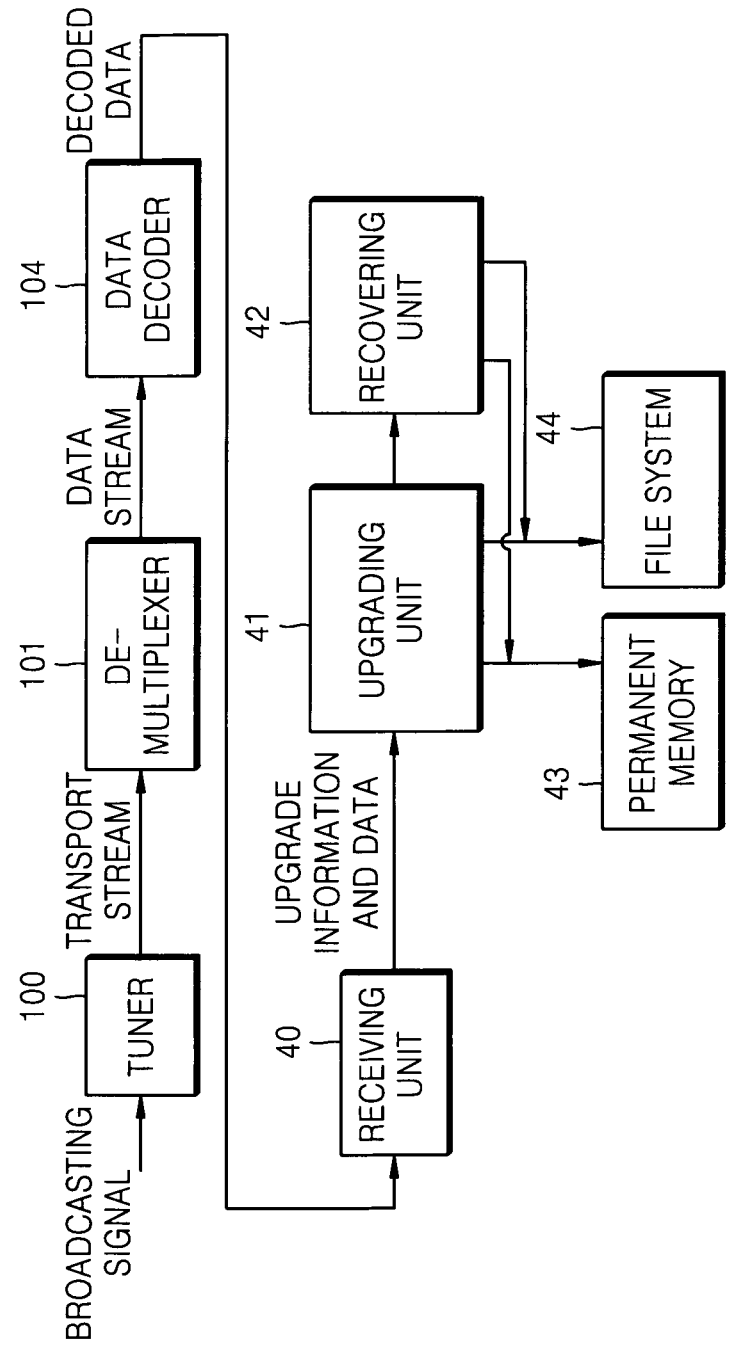
FIG. 4 shows a software upgrading apparatus in a digital broadcasting receiver according to another exemplary embodiment of the present invention.

FIG. 4 shows a software upgrading apparatus in a digital broadcasting receiver according to another exemplary embodiment of the present invention. In this case, the upgrade information and the upgrade data are received in the form of a digital broadcasting signal. However, there is no limitation on the methods of receiving the upgrade information and the upgrade data. As described above, the upgrade information and the upgrade data may be received through a home network or from an external memory such as a USB memory.

Referring to FIG. 4, the software upgrading apparatus in the digital broadcasting receiver according to an exemplary embodiment includes a receiving unit 40, an upgrade performing unit 41, and a recovery unit 42.

The receiving unit 40 receives the upgrade information and the upgrade data of the software. The upgrade information includes information on the software version and information on the upgrading method. The upgrade data is stored in the permanent memory or the file system according to the upgrade information for the upgrading of the software. For some upgrading methods included in the upgrade information, applications or scripts required for upgrading the software may be received. The upgrade information may be included in an extensible markup language (XML) file or a binary file.

Figure 5:
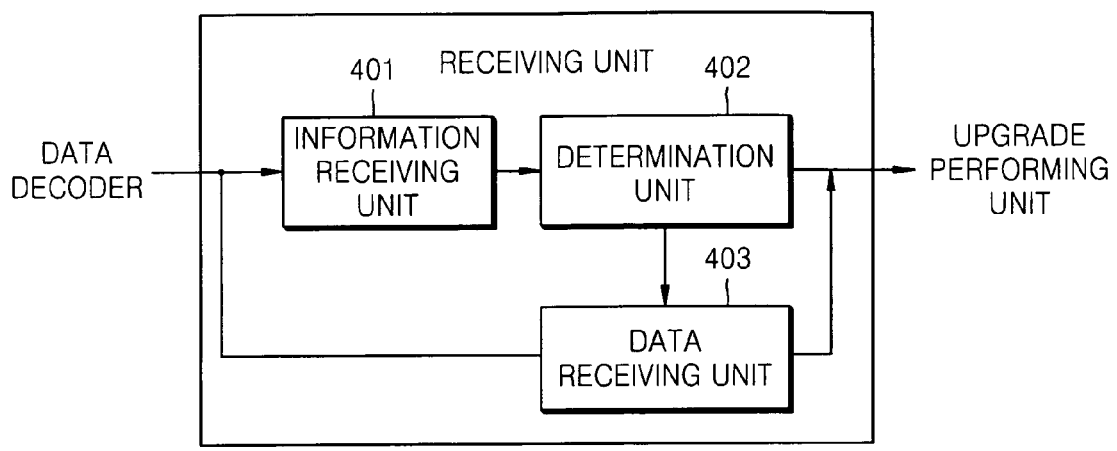
FIG. 5 shows an apparatus for receiving upgrade information and data in a digital broadcasting receiver according to another exemplary embodiment of the present invention.

FIG. 5 shows an apparatus for receiving upgrade information and data in a digital broadcasting receiver according to another exemplary embodiment of the present invention. Referring to FIG. 5, a receiving unit 40 includes an information receiving unit 401, a determination unit 402, and a data receiving unit 403.

The information receiving unit 401 receives the upgrade information. If the upgrade information is received in the form of a digital broadcasting signal, the upgrade information is received through a data decoder 104.

The determination unit 402 determines whether each of the modules included in the software needs to be upgraded, based on the information on the versions of the modules included in the upgrade information.

The data receiving unit 403 selectively receives only the upgrade data for the modules that are determined to need upgrading by the determination unit 402.

The upgrade performing unit 41 performs the upgrading of the software according to the upgrade information by using the upgrade data received by the receiving unit 40. Since the upgrade information includes the information on the versions of the modules included in the software and the information on the upgrading method, it is possible to individually upgrade each module.

Alternatively, the upgrading may be performed by executing the upgrade application or script which is received together the upgrade data. As a result of the upgrading, the upgrade data is stored in the permanent memory 43 or the file system 44.

When the upgrading performed by the upgrade performing unit 41 does not succeed, the recovery unit 42 recovers the previous software. The previous software, from before the upgrade, is stored in a storage unit of the digital broadcasting receiver. When the upgrading does not succeed, the recovery of the software is performed by reading out and storing the previous software. Similar to the upgrading, the recovery may be performed by executing a predetermined application of script.

Figure 6:
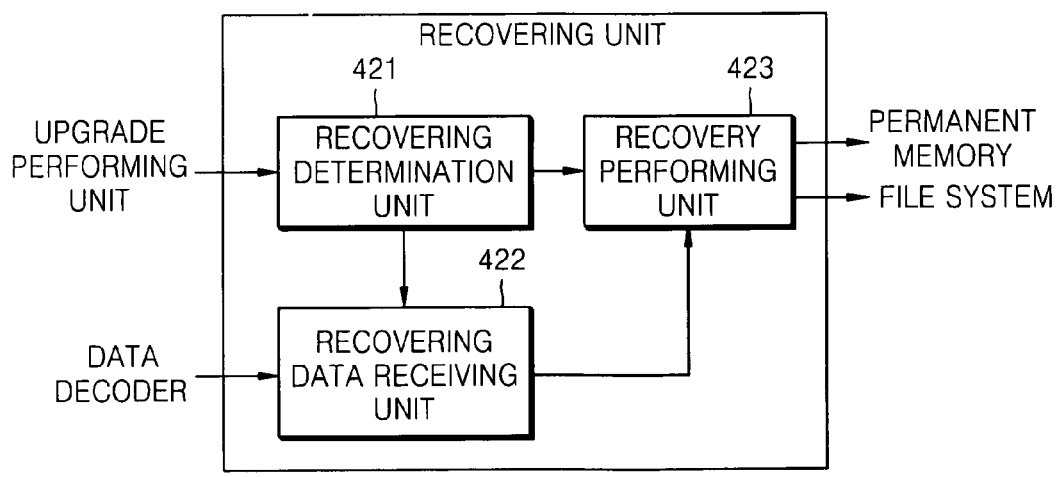
FIG. 6 shows an apparatus for recovering software in a digital broadcasting receiver according to another exemplary embodiment of the present invention.

FIG. 6 shows an apparatus for recovering software in a digital broadcasting receiver according to another exemplary embodiment of the present invention. Referring to FIG. 6, a recovery unit 42 includes a recovering determination unit 421, a recovering data receiving unit 422, and a recovery performing unit 423.

The recovering determination unit 421 determines whether the upgrading performed by the upgrade performing unit 41 has succeeded. If initialization of the software in the digital broadcasting receiver fails, or if A/V data is not properly received, the upgrading has not succeeded.

The recovering data receiving unit 422 receives an application or script required for recovering the software. When the upgrading is determined not to have succeeded by the recovering determination unit 421, data required for recovery is received. When the upgrading is not performed by simply storing the binary image in the permanent memory, the recovery is not completed by simply storing the previous software in the permanent memory. In this case, a separate application or script for the recovery is received.

The recovery performing unit 423 performs the recovery by executing the application or the script received by the recovering data receiving unit 422. The result of the recovery is stored in the permanent memory 43 or the file system 44.

While the present invention has been particularly shown and described with reference to exemplary embodiments thereof, it will be understood by those skilled in the art that various changes in form and detail may be made therein without departing from the spirit and scope of the invention as defined by the appended claims. The exemplary embodiments should be considered in a descriptive sense only, and not for purposes of limitation. Therefore, the scope of the invention is defined not by the detailed description of the invention but by the appended claims, and all differences within the scope will be construed as being included in the present invention. The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the exemplary embodiments, upgrading of software in a digital broadcasting receiver is performed according to upgrade information including information on the versions of a plurality of modules included in the software and information on an upgrading method, by using upgrade data, so that it is possible to efficiently upgrade the software.

In addition, since the upgrade information includes information on upgrading methods, the upgrading can be performed by using the various upgrading methods, so that it is possible to upgrade complicated software.

What is claimed is:

1. A method of upgrading software in a digital broadcasting receiver, comprising:
    receiving upgrade information of the software, wherein the upgrade information includes information on versions of modules included in the software and information on an upgrading method;
    determining whether any module needs to be upgraded, based on the versions of modules included in the software;
    selectively receiving only upgrade data for the modules to be upgraded; and performing the upgrading of the software according to the upgrade information by using the upgrade data;
    wherein the upgrade information includes information on the upgrading method for each of the modules to be updated in the software,
    wherein the upgrade data includes an upgrade application or script which is used to perform the upgrading based on the information on the upgrading method included in the upgrade information, and
    wherein the information on the upgrading method for each of the modules to be updated in the software includes at least one of a type of the upgrade data, a transmission scheme of the upgrade data, a position for storing the upgrade data in a memory, and a time for the upgrading.

2. The method of claim 1, further comprising:
    determining whether the upgrading performed according to the upgrade information succeeds; and
    selectively recovering the software according to a result of the determination.

3. The method of claim 2, wherein the recovering of the software comprises:
   receiving an application or script which is required for selectively recovering the software according to the result of the determination; and
   performing the recovering by executing the application or the script.

4. The method of claim 1, wherein the upgrade information is included in an XML or binary file.

5. The method of claim 1, wherein the software includes at least one of a boot-loader, an operating system (OS), device drivers, libraries, and built-in applications of the digital broadcasting receiver.

6. The method of claim 1, wherein the performing of the upgrading comprises performing individual upgrading for one of a plurality of modules included in the software.

7. The method according to claim 1, wherein the upgrade information includes information on versions of a plurality of different modules and wherein the plurality of different modules have different upgrading methods.

8. An apparatus for upgrading software in a digital broadcasting receiver, comprising:
   a processor and a memory:
   an information receiver which receives upgrade information of the software, wherein the upgrade information includes information on versions of modules included in the software and information on an upgrading method;
   a determiner which determines whether any module needs to be upgraded, based on the versions of modules included in the software;
   a data receiver which selectively receives only upgrade data for the modules to be upgraded; and
   an upgrader which performs the upgrading of the software according to received upgrade information by using the upgrade data;
   wherein the upgrade information includes information on the upgrading method for each of the modules to be updated in the software,
   wherein the upgrade data includes an upgrade application or script which is used to perform the upgrading based on the information on the upgrading method included in the upgrade information, and
   wherein the information on the upgrading method for each of the modules to be updated in the software includes at least one of a type of the upgrade data, a transmission scheme of the upgrade data, a position for storing the upgrade data in a memory, and a time for the upgrading.

9. The apparatus of claim 8, wherein the upgrade information is included in an XML or binary file.

10. The apparatus of claim 8, wherein the upgrading unit performs individual upgrading for one of a plurality of modules included in the software.

11. The apparatus of claim 8, further comprising a recoverer which determines whether the upgrading performed according to the upgrade information succeeds and selectively recovers the software according to a result of the determination.

12. The apparatus of claim 11, wherein the recoverer comprises:
   a recovering determiner which determines whether the upgrading performed according to the upgrade information succeeds;
   a recovering data receiver which receives an application or script which is required for selectively recovering the software according to the result of the determination; and
   a recovering performer which performs the recovering by executing the application or the script.

13. The apparatus of claim 8, wherein the software includes at least one of a boot-loader, an operating system (OS), device drivers, libraries, and built-in applications of the digital broadcasting receiver.

14. A non-transitory computer-readable medium having embodied thereon a computer program for a method, the method comprising:
   receiving upgrade information of software, wherein the upgrade information includes information on versions of modules included in the software and information on an upgrading method;
   determining whether any module needs to be upgraded, based on the versions of modules included in the software;
   selectively receiving only upgrade data for the modules to be upgraded; and performing the upgrading of the software according to the upgrade information by using the upgrade data;
   wherein the upgrade information includes information on the upgrading method for each of the modules to be updated in the software,
   wherein the upgrade data includes an upgrade application or script which is used to perform the upgrading based on the information on the upgrading method included in the upgrade information, and
   wherein the information on the upgrading method for each of the modules to be updated in the software includes at least one of a type of the upgrade data, a transmission scheme of the upgrade data, a position for storing the upgrade data in a memory, and a time for the upgrading.

* * * * *